Nov. 4, 1969  W. OTZIPKA ET AL  3,476,997

BRUSHLESS D.C. MOTOR CONTROL

Filed Feb. 27, 1967

Inventors:
Willi Otzipka
Joachim Mally
BY Spencer & Kaye
Attorneys

United States Patent Office 3,476,997
Patented Nov. 4, 1969

3,476,997
BRUSHLESS D.C. MOTOR CONTROL
Willi Otzipka and Joachim Mally, Berlin, Germany, assignors to Licentia Patent-Verwaltungs-G.m.b.H., Frankfurt am Main, Germany
Filed Feb. 27, 1967, Ser. No. 618,849
Claims priority, application Germany, Mar. 4, 1966, L 53,005
Int. Cl. H02k 29/02; H02p 5/06
U.S. Cl. 318—138                    7 Claims

ABSTRACT OF THE DISCLOSURE

A brushless D.C. motor control including one magnetic field sensitive transistor for each stator winding, each transistor having a base, emitter, primary collector and secondary collector, having its primary collector-emitter circuit connected in series between its associated stator winding and a current source, and having its secondary collector coupled to its base and to one side of the current source via resistors, the motor shaft carrying a magnet positioned to pass a magnetic field through each transistor during a predetermined portion of each shaft revolution, conduction of current to each stator winding being prevented when its transistor is under the influence of the magnetic field.

BACKGROUND OF THE INVENTION

The present invention relates to brushless direct current motor controls, and particularly to such controls employing transistors for controlling the supply of current to the motor stator windings.

It has already been suggested to control such a motor by connecting an individual transistor in series with each stator winding and by controlling the conduction of each transistor in dependence on the position of the rotor, a high frequecy oscillator being employed to effect an inductive control of the transistors. Such arrangements may, for example, be employed for driving battery-operated tape recorders, record players, and the like. Since pieces of equipment of this type are often employed in conjunction with other electronic units, the motor and its control circuitry must be provided with shielding in order to prevent the high frequency oscillations present in the motor and its control circuitry from adversely affecting the operation of the other units.

SUMMARY OF THE INVENTION

It is a primary object of the present invention to eliminate the need for such shielding.

A more specific object of the present invention is to improve the control of direct current motors.

A further object of the present invention is to simplify the circuitry required for controlling such motors.

Still another object of the present invention is to eliminate the need for high frequency oscillators for controlling the supply of current to the D.C. motor stator.

These and other objects according to the present invention are achieved, in a device composed of a D.C. motor having a plurality of stator windings, and a control circuit having a plurality of transistors each connected for supplying energizing current from a source to a respective stator winding, by the provision of the improvement wherein each transistor is constituted by a magnetic field sensitive transistor. In preferred embodiments of the present invention, the transistors are controlled by a permanent magnet which is mounted for rotation with the motor shaft, and which may constitute the motor rotor, the magnetic field of this magnet acting to control the conduction of current through each transistor to its associated stator winding.

This arrangement has the advantage that the control can be effected directly at the transistors, it no longer being necessary to provide any complicated arrangements for controlling the transistors, as for example oscillators and elements for transmitting the oscillator output to the base circuit of each transistor.

Magnetic field transistors used in the present invention have, besides the base, emitter and primary collector electrodes, a secondary collector, and have the characteristic that when a magnetic field is caused to pass through the transistor, part of the current flowing from the emitter to the primary collector is diverted to the secondary collector. The current flowing to the secondary collector can be varied in dependence on the strength of the applied magnetic field. This current can be made so large that the current flowing to the primary collector becomes close to zero, i.e., that the current flowing to the primary collector practically disappears. One form of magnetic field sensitive transistor which can be employed in embodiments of the present invention is described in the German Patent No. 1,206,080 published Dec. 2, 1965.

DESCRIPTION OF THE PREFERRED EMBODIMENTS

Figure 1:
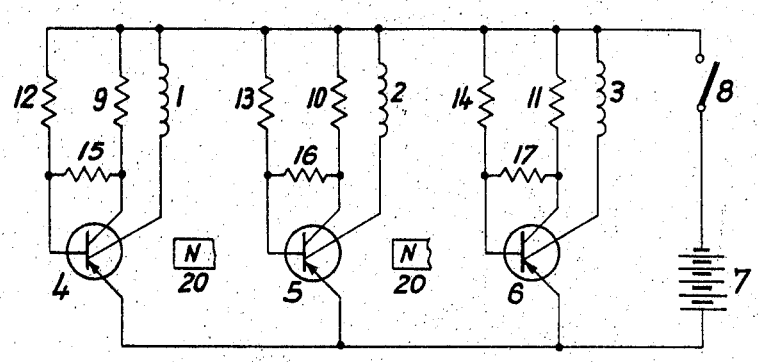
FIGURE 1 is a schematic diagram of one embodiment of the motor according to the present invention.
Figure 2:
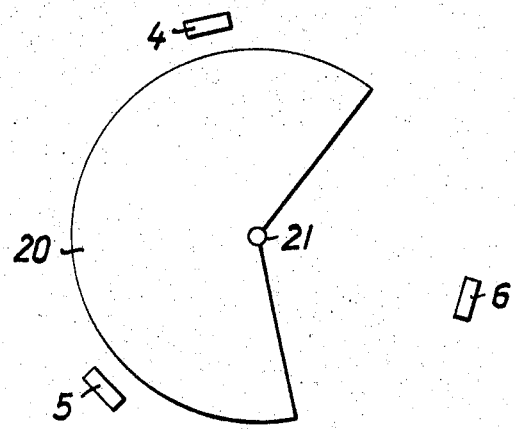
FIGURE 2 is an axial view of a portion of the motor of the present invention.

Referring now to FIGURES 1 and 2, there is shown a circuit incorporating motor stator windings 1, 2 and 3 which are energized, via magnetic field sensitive transistors 4, 5 and 6, respectively, from the current source 7, when the switch 8 is closed. The stator windings are connected to the primary collectors of the transistors. The secondary collector of each transistor is connected, via a respective one of the resistors 9, 10 and 11, to the negative pole of the current source. The base of each transistor is also connected to the negative pole of the current source 7, via a respective one of the resistors 12, 13 and 14. The secondary collector of each transistor is also connected to the base of the same transistor, via a respective one of the resistors 15, 16 and 17.

The circuit operates as follows:

In the illustrated position, the transistors 4 and 5 are subjected to a magnetic field which is produced by the magnet 20. This magnet is fixedly mounted on the shaft of the motor and rotates together therewith. If there are three transistors, that is to say, if the motor includes three stator windings, the magnet is shaped to subtend an angle of 240°. This is shown most clearly in FIGURE 2 where the magnet 20 is mounted for rotation on motor shaft 21.

If there is a different number of stator windings, the angle will be different. If there are $n$ stator windings the magnet is shaped to subtend an angle of $$\left(360^\circ - \frac{360^\circ}{n}\right)$$

In other words, the angle subtended by the magnet must be sufficient to influence all but one of the transistors at any given time.

When the switch 8 is closed, the stator winding 3 is energized via the emitter-primary collector path of the transistor 6, and the motor begins to run. No current flows through the secondary collector of the transistor 6. At the same time, the other two transistors 4 and 5 are, due to the presence of the magnetic field produced by magnet 20, placed in such condition that almost all of their current flows from emitter to the secondary collector, and therefore substantially no current flows through the stator windings 1 and 2.

Insofar as transistor 5 is concerned, for example, the current flows from its secondary collector through the resistor 10 and back to the battery 7. As a result, the potential of the secondary collector increases in a positive direction and, since the secondary collector is coupled to the base of the transistor 5 via the resistor 16, the base potential increases positively so as to cause the transistor 5 to be rendered completely nonconductive so that no current whatsoever will flow therethrough. Therefore, the stator winding 2 associated therewith receives no current. The same applies to the transistor 4 and the stator winding 1 associated therewith. In this way, as the rotor rotates together with the permanent magnet 20, one of the magnetic field sensitive transistors 4, 5 and 6 will at any one time be current-conductive while the other transistors will be nonconductive and hence will prevent the flow of current. Thus, only one of the three stator windings 1, 2 and 3, which are displaced in the stator by 120° with respect to each other, will be energized.

It will be understood that the magnetic field sensitive transistors 4, 5 and 6 could also be connected as control elements in the base circuits or conventional npn or pnp transistors with the primary collector, for example, of each magnetic field sensitive transistor connected to the base of a respective conventional transistor, in which case the stator windings would be connected in the collector-emitter circuit of these latter transistors.

It will be understood that the above description of the present invention is susceptible to various modifications, changes, and adaptations, and the same are intended to be comprehended within the meaning and range of equivalents of the appended claims.

We claim:

1. In a device comprising a D.C. motor having a plurality of stator windings, a control circuit having a plurality of transistors each connected for supplying energizing current from a source to a respective stator winding, rotor means and means mounting the rotor for rotation relative to the stator and the transistors, the improvement wherein the rotor means carries a permanent magnet, and each of said transistors is constituted by a magnetic field sensitive transistor which is positioned adjacent the path followed by said magnet during rotation.

2. An arrangement as defined in claim 1 wherein each of said transistors includes a base, an emitter, a primary collector and a secondary collector, and wherein current flowing from said emitter is diverted toward said secondary collector when said transistor is under the influence of the magnetic field of said magnet.

3. An arrangement as defined in claim 2 wherein said magnet is shaped for producing a magnetic field which passes through fewer than all of said transistors at any one time.

4. An arrangement as defined in claim 3 wherein said magnet is shaped for producing a magnetic field which passes through all but one of said transistors at any given time.

5. An arrangement as defined in claim 4 wherein said magnet has the form of a segment of a circle and said transistors are distributed uniformly about the motor shaft.

6. An arrangement as defined in claim 1 further comprising a first plurality of resistors, one for each said transistor, each resistor being connected between the secondary collector and the base of its respective transistor.

7. An arrangement as defined in claim 6, further comprising: a second plurality of resistors, one for each said transistor, each connected between the secondary collector of its respective transistor and the negative terminal of the current supply source; and a third plurality of resistors, one for each said transistor, each connected between the base of its respective transistor and the negative terminal of the current supply source.

References Cited

UNITED STATES PATENTS

| | | |
|---|---|---|
| 3,035,183 | 5/1962 | Siebertz. |
| 3,185,910 | 5/1965 | Knapp _____ 318—138 |
| 3,200,316 | 8/1965 | Engel _____ 318—138 |
| 3,293,541 | 12/1966 | Yamamoto. |
| 3,305,717 | 2/1967 | Weiss _____ 318—254 |
| 3,375,422 | 3/1968 | Boudigues _____ 318—254 XR |
| 3,383,574 | 5/1968 | Manteuffel _____ 318—254 XR |

FOREIGN PATENTS 1,206,080   12/1965   Germany.

ORIS L. RADER, Primary Examiner

G. R. SIMMONS, Assistant Examiner

U.S. Cl. X.R.

307—299, 309; 318—254